United States Patent [19]

Imai et al.

[11] Patent Number: 4,880,764
[45] Date of Patent: * Nov. 14, 1989

[54] DEHYDROGENATION CATALYST AND PROCESS

[75] Inventors: Tamotsu Imai, Mt. Prospect; Hayim Abrevaya, Wilmette, both of Ill.

[73] Assignee: UOP, Des Plaines, Ill.

[*] Notice: The portion of the term of this patent subsequent to Nov. 22, 2005 has been disclaimed.

[21] Appl. No.: 289,137

[22] Filed: Dec. 23, 1988

Related U.S. Application Data

[60] Continuation-in-part of Ser. No. 221,977, Jul. 20, 1988, Pat. No. 4,827,072, which is a division of Ser. No. 131,882, Dec. 11, 1987, Pat. No. 4,786,625, which is a continuation-in-part of Ser. No. 18,541, Feb. 25, 1987, Pat. No. 4,716,143, which is a continuation-in-part of Ser. No. 871,356, Jun. 6, 1986, abandoned.

[51] Int. Cl.$^4$ .................. B01J 21/04; B01J 23/58; B01J 23/62
[52] U.S. Cl. .................. 502/326; 502/327; 502/328; 502/330; 502/349; 502/352; 502/514; 502/523; 502/527; 585/660
[58] Field of Search .............. 585/443, 444, 445, 460; 502/326, 328, 327, 330, 349, 352, 514, 523, 527

[56] References Cited

U.S. PATENT DOCUMENTS

| 3,259,589 | 7/1966 | Michalko | 502/334 |
|---|---|---|---|
| 3,367,888 | 2/1968 | Hoekstra | 502/334 |
| 3,651,167 | 3/1972 | De Rosset | 585/260 |
| 3,755,481 | 8/1973 | Hayes | 585/434 |
| 3,761,531 | 9/1973 | Bloch | 585/434 |
| 3,931,054 | 1/1976 | Lester | 502/332 |
| 3,936,395 | 2/1976 | Hayes | 252/466 |
| 4,003,852 | 1/1977 | Hayes | 252/466 |
| 4,104,317 | 8/1978 | Antos | 585/434 |
| 4,672,146 | 6/1987 | Abrevaya | 585/660 |
| 4,716,143 | 12/1987 | Imai | 585/660 |
| 4,786,625 | 11/1988 | Imai et al. | 585/660 |
| 4,827,072 | 5/1989 | Imai | 585/443 |

*Primary Examiner*—Asok Pal

[57] ABSTRACT

A novel catalytic composite and a process of its use is disclosed. The catalyst comprises a platinum group metal component, a first modifier component selected from Group IA and IIA elements of the Periodic Table, a second modifier components selected from the group of elements consisting of palladium, iridum, and osmium, and a third modifier component selected from the elements of Group IVA of the Peridoic Table of the Elements. All of the catalytic components are located on a refractory oxide support having a nominal diameter (d) of from 50 to 1000 microns. The catalytic composite is characterized in that the second modifier component is surface-impregnated upon the support in such a manner that the average concentration of the surface-impregnated second modifier component on the outside 0.2d micron catalyst layer is at least 2 times the average concentration of the second modifier component in 0.4d micron diameter center core of the catalyst where d is the nominal diameter, and wherein the first modifier metal component is uniformly impregnated. The catalytic composite has been found to be most useful in the dehydrogenation of dehydrogenatable hydrocarbons.

11 Claims, 2 Drawing Sheets

DEHYDROGENATION CATALYST AND PROCESS

CROSS-REFERENCE TO RELATED APPLICATIONS

This application is a continuation-in-part of prior copending application Ser. No. 221,977 filed July 20, 1988 now U.S. Pat. No. 4,827,072, which in turn is a Rule 1.60 Division of application Ser. No. 131,882 filed Dec. 11, 1987, now U.S. Pat. No. 4,786,625 which is a continuation-in-part of application Ser. No. 018,541 filed Feb. 25, 1987, now U.S. Pat. No. 4,716,143, which is a continuation-in-part of application Ser. No. 871,356 filed June 6, 1986, now abandoned.

BACKGROUND OF THE INVENTION

This invention relates to the conversion of hydrocarbons, especially the dehydrogenation of dehydrogenatable hydrocarbons, in the presence of a catalyst composite. This invention also pertains to a new catalyst composite.

The dehydrogenation of hydrocarbons is an important commercial process because of the great demand for dehydrogenated hydrocarbons for the manufacture of various chemical products such as detergents, high octane gasolines, pharmaceutical products, plastics, synthetic rubbers, and other products well known to those skilled in the art. One example of this process is dehydrogenating isobutane to produce isobutylene which can be polymerized to provide tackifying agents for adhesives, viscosity-index additives for motor oils and impact-resistant and anti-oxidant additives for plastics.

INFORMATION DISCLOSURE

Several catalytic composites relevant to the composition of the instant invention are disclosed in the art, however, no references or combination of references discloses the unique combination of components of the catalyst of this invention. U.S. Pat. Nos. 3,936,395 and 4,003,852 both disclose a catalytic composition containing platinum or palladium, iridium, an alkali or alkaline earth metal, and a fourth component. The fourth component of the '852 patent may be tin or lead while the fourth component of the '395 patent is germanium. In both of these patents, it is specifically disclosed and claimed that all components are uniformly impregnated upon the non-acidic catalytic composite. These patents are distinguished from the catalyst of the instant invention in that the iridium component of the instant catalyst is surface-impregnated on the catalyst support.

Numerous catalytic composites comprising a group VIII metal component and a modifier metal component selected from the group consisting of a tin component, germanium component, rhenium component, and mixtures thereof are known. For example related U.S. Pat. Nos. 3,632,503, 3,755,481, and 3,878,131 disclose catalysts comprising a platinum group component, a tin component, and a germanium component on a porous carrier material. However, these references disclose that best results are achieved when a germanium component is uniformly distributed throughout the carrier material. However, the reference is silent as to any advantage to be achieved by limiting the location of substantially all of the catalytic metals to an outer layer of the catalyst particle. In fact, it is indicated in these references that it is preferred that the catalytic composite thereof be subjected to a substantially water-free reduction step prior to its use in the conversion of hydrocarbons. It is further disclosed that the step is designed to ensure a uniform and finely divided dispersion of metallic components throughout the carrier material.

Related U.S. Pat. Nos. 3,682,838 and 3,761,531 disclose catalytic composites comprising a platinum group component, and a Group IVA metallic component. As with the previous references it is disclosed therein that it is preferred that the catalysts are subjected to a reduction step prior to their use. It is further disclosed in these references that the reduction step is designed to assure uniform distribution of the metallic particles throughout the catalysts.

U.S. Pat. Nos. 3,558,477, 3,562,147, 3,584,060, and 3,649,566 all disclose catalytic composites comprising a platinum group component, and a rhenium component on a refractory oxide support. However, as before these references disclose that the best results ae achieved when the platinum group component and rhenium component are uniformly distributed throughout the surface and pores of the catalyst.

U.S. Pat. No. 3,897,368 describes a method for the production of a noble metal containing catalyst where the noble metal is platinum and the platinum is the only catalytic metal present and it is deposited selectively upon the external surface of the catalyst. This disclosure describes a method of producing a catalyst containing platinum only by impregnating platinum on the exterior layer of the particle. The method claimed utilizes a non-ionic surface active agent to achieve the surface impregnation of the noble metal. Additionally, U.S. Pat. Nos. 3,367,888; 3,931,054; and 3,259,589 all teach methods of impregnating a catalyst with a Group VIII metal component that is similar to the method employed to produce the surface-impregnated catalyst of the instant invention. However, the '054 patent describes a method of impregnating a catalyst base such that the Group VIII metal component is located below the surface of the catalyst. In addition, the '368, '888, and '589 patents describe a method of making a catalyst where said catalyst does not contain the useful modifier metal components of the instant invention. Thus, while these disclosures describe a portion of the method used to fabricate the catalyst of the instant invention, they do not teach the entire method as described herein. Surprisingly, it has been discovered that by surface impregnating upon the catalyst support substantially all of the platinum group metal component and uniformly impregnating the other catalytic effective components, a catalyst displaying improved performance in a dehydrogenation process is obtained.

SUMMARY OF THE INVENTION

It is an object of the present invention to provide an improved catalytic composite. A corollary objective is to provide an improved process for the conversion of hydrocarbons and especially for the dehydrogenation of dehydrogenatable hydrocarbons using the improved catalytic composite.

Accordingly, in a broad embodiment, the present invention is a catalytic composite comprising a platinum component, a first catalytic modifier component selected from Group IA and IIA elements of the Periodic Table of the Elements or mixtures thereof, a second catalytic modifier component selected from the group iridium, osmium, or mixtures thereof, and a third catalytic modifier component selected from the elements of Group IVA of the Periodic Table of the Elements or mixtures thereof. All of the components are located on a refractory oxide support having a nominal diameter (d) of from 50 to 10000 microns. The catalytic composite is characterized in that the second catalytic modifier component is surface-impregnated upon a catalytic composite such that the average concentration of a surface-impregnated second catalytic modifier component on the outside 0.2 d micron layer of the catalyst is at least two times the average concentration of the second catalytic modifier component in the 0.4 d micron diameter center core of the catalyst. The catalytic composite is further characterized in that the first modifier metal component is uniformly impregnated through the refractory oxide support. In a most preferred embodiment, this invention is a catalytic composite comprising from 0.1 to 2.0 wt.% platinum, from 0.1 to 5.0 wt.% lithium, from 0.1 to 2.0 wt.% iridium, and from 0.1 to 5.0 wt.% tin. All of the catalytic components are located on an alumina support having a nominal diameter (d) of from 50 to 10000 microns. The catalytic composite is characterized in that the iridium component is surface-impregnated such that the average concentration of the surface-impregnated iridium on the outside 0.2 d micron layer of the catalyst is at least two times the average concentration of the iridium in the 0.4 d micron diameter center core of the catalyst. The catalytic composite is further characterized in that the platinum, lithium, and tin components are uniformly impregnated throughout the alumina support.

In an alternative embodiment, the invention is a hydrocarbon conversion process comprising the steps of contacting a hydrocarbon at hydrocarbon conversion conditions with a catalytic composite comprising platinum, a first catalytic modifier component selected from Group IA or IIA elements of the Periodic Table of the Elements or mixtures thereof, a second catalytic modifier component selected from the group iridium, osmium, and mixtures thereof, and a third catalytic modifier component selected from the elements of Group IVA of the Periodic Table of the Elements or mixtures thereof. All of the catalytic components are located on a refractory oxide support having a nominal diameter of 50 to 10000 microns. After contacting the hydrocarbon feed at hydrocarbon conversion conditions with the above catalyst, the products of the process are recovered. The hydrocarbon conversion process is characterized in that the second catalytic modifier component of the catalytic composite is surface-impregnated such that the average concentration of the surface-impregnated second modifier components on the outside 0.2 d micron layer of the catalyst is at least two times the average concentration of the second modifier component in the 0.4 d micron diameter center core of the catalyst. The process is further characterized in that the hydrocarbon conversion catalyst comprises a uniformly impregnated first metal component. In a most preferred embodiment, the hydrocarbon conversion process is a dehydrogenation process comprising the steps of contacting dehydrogenatable hydrocarbons having from 2 to 30 carbon atoms and a diluent gas present at a molar ratio of diluent gas to dehydrogenatable hydrocarbon of from 0.1 to 20 at dehydrogenation conditions including a temperature of from 400°–700° C., a pressure of from 0.1 to 5.0 atmospheres, and a liquid hourly space velocity of from 0.1 to 100 $hr^{-1}$ with a catalytic composite, and recovering the products of the dehydrogenation process. The catalytic composite comprises from about 0.1 to 2 wt.% platinum, from about 0.1 to 5 wt.% lithium, from about 0.1 to 2 wt.% iridium, and from 0.1 to 5 wt.% tin. All of the catalytic components are located on an alumina support having a nominal diameter (d) of from 50 to 10000 microns. The process is characterized in that the iridium component is surface-impregnated such that the average concentration of the iridium on the outside 0.2 d micron layer of the catalyst is at least two times the average concentration of the iridium component in the 0.4 d micron diameter center core of the catalyst. The dehydrogenation catalyst is further characterized in that the platinum, lithium, and tin components are uniformly impregnated.

These as well as other objects and embodiments of this invention will become apparent upon review of the more detailed description of the invention hereinafter set forth.

DETAILED DESCRIPTION OF THE INVENTION

Figure 1:
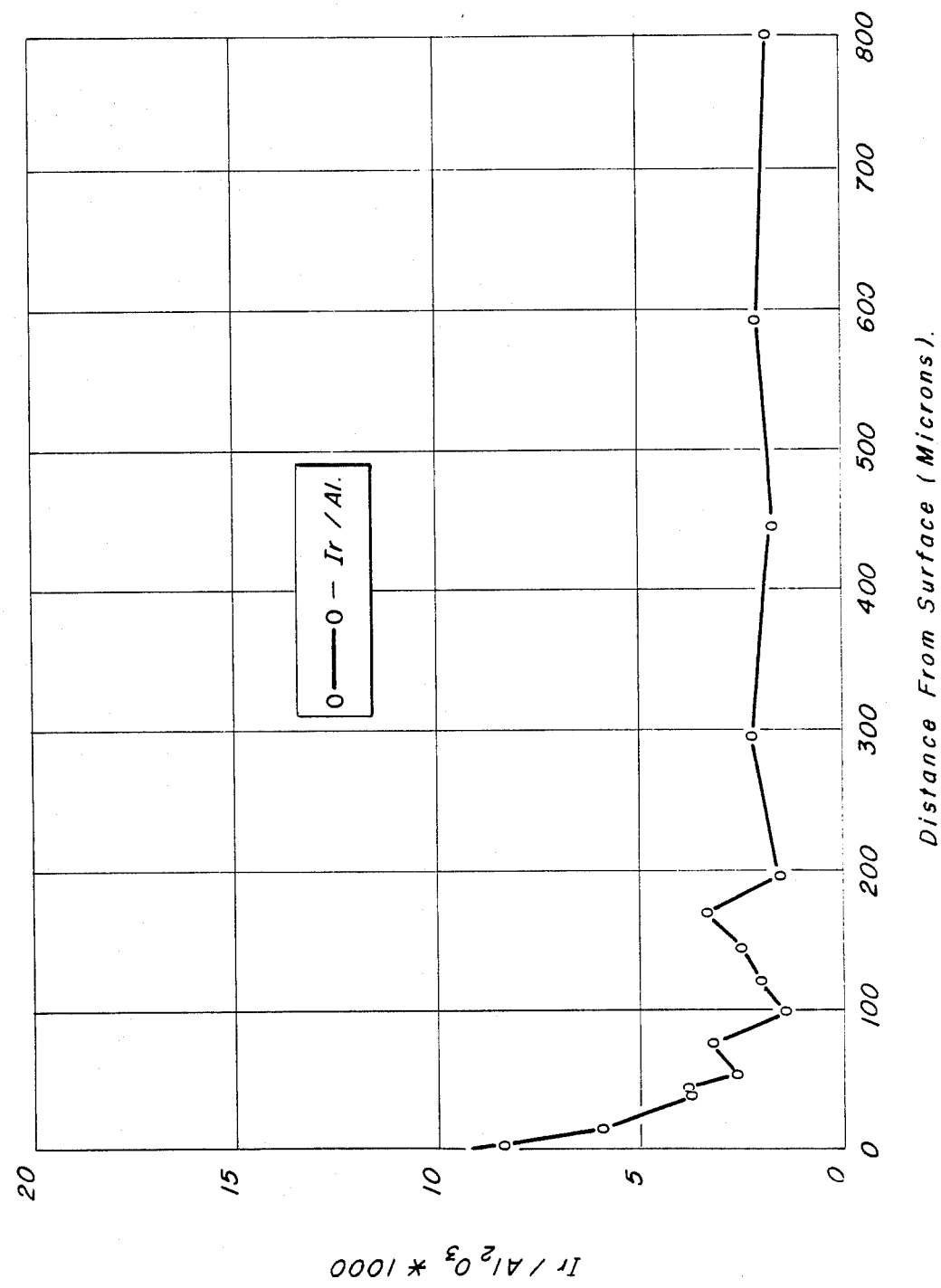
FIGS. 1 and 2 are graphical representations of the iridium metal gradient across the radius of catalysts of Examples II and III, respectively. The metals distribution is presented as a ratio of the iridium concentration to alumina concentration of the catalyst reported as $Al_2O_3$ plotted against the distance in microns from the surface of the particle. The distributions were determined by utilizing an energy dispersive X-ray analyzer (EDX) coupled to a scanning electron microscope (SEM). It should be noted that the figures do not represent actual iridium across the radius of a catalyst pill.

To summarize, the present invention is an improved catalytic composite as well as a process for the use thereof.

An essential feature of the catalyst of the present invention is that the second catalytic modifier component selected from the group iridium, osmium and mixtures thereof is surface-impregnated upon a catalytic support material such that the average concentration of the second catalytic modifier component in the outer 0.2 d micron layer of the catalyst is at least twice that of the 0.4 d micron diameter center core of the catalyst support where d is the nominal diameter of the catalyst particle in microns. The catalyst also comprises a first catalytic modifier metal component which is uniformly dispersed throughout the catalyst support. The first catalytic modifier component is selected from Group IA and IIA elements of the Periodic Table of the Elements or mixtures thereof. The third catalytic modifier component is selected from Group IVA elements of the Periodic Table of the Elements or mixtures thereof. It is to be understood that the term "exterior" is defined as the outermost layer of the catalyst particle. By "layer", it is meant a stratum of substantially uniform thickness. Also it is to be understood that the nominal diameter of the instant catalyst particle may vary from 50 to 10000 microns. Finally, by "0.2 d" and "0.4 d", it is meant that the nominal diameter (d) is multiplied by 0.2 or 0.4.

Alternatively, where the catalyst composite has a nominal diameter of at least 850 microns, the surface impregnated second catalytic modifier component may be described as being on average of at least twice as concentrated in the outer 100 micron layer of the catalyst support in comparison to the average concentration of the second modifier component in the 200 micron center core of the catalyst particle.

The second catalytic modifier component is considered to be surface-impregnated when the average concentration of said second modifier component within the 0.2 d micron exterior layer of the catalyst is at least about two times the average concentration of the same metal component in the 0.4 d micron diameter center core of the catalysts. In addition to the surface-impregnated second catalytic modifier component, it is also an aspect of this invention that the first modifier metal component is uniformly impregnated. This characterization of the catalytic composite is intended to describe a second modifier component concentration gradient upon and within the catalyst support. The concentration of the second catalytic modifier component within the 0.2 d micron layer surface of the support as stated is at least twice that of the second modifier component concentration within the 0.4 d micron in diameter center of the catalyst where d is the nominal diameter of the catalyst particle which may vary from 50 to 10000 microns. The surface-impregnated metal concentration then tapers off as the center of the support is approached. The actual gradient of the second catalytic modifier component within the catalyst support varies depending upon the exact manufacturing method employed to fabricate the catalyst. However, it is desired to place as much of the surface-impregnated second catalytic modifier component upon the 0.2 d micron exterior layer of the catalyst particle as possible so the expensive surface-impregnated metal component can be efficiently used in a dehydrogenation process.

Although it is not understood completely, it is believed that by restricting substantially all of the surface-impregnated second catalytic modifier component to at most a 0.2 d micron wide exterior layer of the catalyst, formation of large coke layers from small coke precursor molecules are substantially prevented at the very exterior layer of the catalyst. This has two favourable effects. First, the second catalytic modifier sites at the exterior layer of the particle over which most of the dehydrogenation reactions occur remain accessible to the hydrocarbon feed for longer periods of time. Secondly, catalyst support pore mouths at the exterior layer of the alumina support are not plugged and remain able to provide easy access to incoming and outgoing reactant and product molecules.

The first essential component of the catalyst composite is platinum. This platinum component mostly likely exists within the final catalytic composite in a near-zero-valent state in chemical combination with one or more of the other ingredients of the catalyst composite. Generally, this component may be present in the final catalyst composite in an amount ranging from 0.01 to 5.0 wt.%. However, relatively small amounts are preferred. In fact, the platinum component generally will comprise about 0.01 to about 2 wt.% of the final catalytic composite, calculated on an elemental basis. Excellent results are obtained when the catalyst contains about 0.05 to about 1 wt.% of platinum.

This platinum component may be incorporated in the catalytic composite in any suitable manner, such as coprecipitation or cogelation, ion-exchange, or impregnation, to provide a uniform or non-uniform dispersion of the platinum component within the carrier material. The preferred method of preparing the catalyst involves the utilization of a soluble, decomposable compound of platinum to impregnate the carrier material. For example, this component may be added to the support by commingling the latter with an aqueous solution of chloroplatinic acid. Other water-soluble compounds of platinum may be employed in impregnation solutions and include ammonium chloroplatinate, bromoplatinic acid, platinum dichloride, platinum tetrachloride hydrate, platinum dichlorocarbonyl dichloride, dinitrodiaminoplatinum, etc. The utilization of a platinum chloride compound, such as chloroplatinic acid, is preferred since it facilitates the incorporation of both the platinum component and at least a minor quantity of an optional halogen component onto the catalyst in a single step. Best results, that is, a uniform platinum impregnation is obtained in the preferred impregnation step if the platinum compound yields complex anions containing platinum in acidic aqueous solutions. Hydrogen chloride or the like acid is also generally added to the impregnation solution in order to further facilitate the incorporation of the optional halogen component and the distribution of the metallic component. In addition, it is generally preferred to impregnate the carrier material after it has been calcined in order to minimize the risk of washing away the valuable platinum compounds; however, in some cases, it may be advantageous to impregnate the carrier material when it is in a gelled state.

The next essential component of the catalytic composite of this invention is a uniformly impregnated first catalytic modifier component. The first catalytic modifier component is selected from Group IA and IIA elements of the Periodic Table of the Elements or mixtures of such elements. Group IA and IIA elements are also commonly known as alkali or alkaline earth metals. Such IA and IIA elements include lithium, sodium potassium, rubidium, cesium, magnesium, calcium, strontium, and barium.

The first catalytic modifier component may exist within the catalytic composite as a relatively stable compound such as the oxide or sulfide or in combination with one or more of the other components of the composite, or in combination with an alumina carrier material such as in the form of a metal aluminate. Since, as is explained hereinafter, the composite containing the first catalytic modifier component is always calcined in an air atmosphere before use in the conversion of hydrocarbons, the most likely state this component exists in during use in dehydrogenation is the metallic oxide. Regardless of what precise from in which it exists in the composite, the amount of first catalytic modifier component is preferably selected to provide a composite containing about 0.01 to about 10 wt.% of the first catalytic modifier component, and more preferably about 0.05 to about 5 wt.%. Best results are ordinarily achieved when this component is a compound of lithium, potassium, cesium, or mixtures thereof.

This first catalytic modifier component may be combined with the porous carrier material in any manner known to those skilled in the art such as by impregnation, coprecipitation, physical admixture, ion exchange, etc. However, the preferred procedure involves impregnation of the carrier material either before or after it is calcined and either before, during, or after the other components are added to the carrier material. Best results are ordinarily obtained when this component is added in conjunction with or after the platinum component and third modifier metal component. Typically, the impregnation of the carrier material is performed by contacting same with a solution of a suitable, decomposable compound or salt of the desired alkali or alkaline earth metal. Hence, suitable compounds include the halides sulfates, nitrates, acetates, carbonates, and the like compounds. For example, excellent results are obtained by impregnating the carrier material after the platinum component has been combined therewith with an aqueous solution of lithium nitrate or potassium nitrate.

The next essential component of the instant catalytic composite is a surface-impregnated second catalytic modifier component. The surface-impregnated second catalytic modifier component is selected from the group consisting of iridium, and osmium, or mixtures thereof. The second catalytic modifier component may be incorporated into the catalytic composite by any method designed to result in the surface-impregnation of the second catalytic modifier component.

The second catalytic modifier component is considered surface-impregnated when the average concentration of said component within the exterior 0.2 d micron layer of the catalyst is at least 2 times the average concentration of the same metal component in the 0.4 d micron diameter center portion of the catalyst, where 'd' is the nominal particle diameter.

As previously stated, the surface-impregnated second catalytic modifier component is selected from the group consisting of osmium, iridium, or mixtures thereof. The surface-impregnated second modifier component may be present in the composite as an elemental metal or in chemical combination with one or more of the other ingredients of the composite, or as a chemical compound of the component, such as the oxide, oxyhalide, sulfide, halide, and the like. The second catalytic modifier component may be utilized in the composite in any amount which is catalytically effective, such as from 0.01 to 5.0 wt.%, with the preferred amount being about 0.1 to about 2 wt.% thereof, calculated on an elemental metal basis. Typically, best results are obtained with about 0.05 to about 1 wt.% of surface-impregnated metal. Additionally, it is within the scope of the present invention that the beneficial results may be obtained by having more than one of the above-named metals surface-impregnated on the catalyst.

The surface-impregnated component may be incorporated into the catalytic composite in any suitable manner which results in the metal component being concentrated in the exterior surface of the catalyst support in the preferred manner. In addition, it may be added at any stage of the preparation of the composite and the precise method of incorporation used is not deemed to be critical so long as the resulting metal component is surface-impregnated as the term is used herein. A preferred method of incorporating the second catalytic modifier component is an impregnation step wherein the porous carrier material is impregnated with a suitable second catalytic modifier metal-containing aqueous solution. It is also preferred that no acid compounds besides that which might be inherent to the second catalytic modifier impregnation component are to be added to the impregnation solution. In a particularly preferred method of preparation, the carrier material, containing the first and third modifier metal component and platinum, is subjected to calcination, as is explained hereinafter, prior to the impregnation of the surface-impregnated metal components. Aqueous solutions of water soluble, decomposable surface-impregnated metal compounds are preferred, includig ammonium hexachloroosmium, dihydridohexachloroosmium, hexachloroosmium, hexahydrate, chloroiridic acid, iridium bromide, iridium acetylacetonate, iridium trichloride, iridium tetrachloride, and the like compounds. It is believed that the impregnation of the catalyst composite with the desired metal salt proceeds at a slow rate in the absence of additional acid. In this manner, the impregnation step can be interrupted at a point where the component being impregnated is essentially surface-impregnated.

The final essential component of the catalytic composite of this invention is a third catalytic modifier component consisting of elements of Group IVA of the Periodic Table of the Elements or mixtures thereof. Such useful Group IVA elements include lead, tin, germanium, and mixtures thereof.

An essential feature of the present invention is a third catalytic modifier metal component selected from the group consisting of a tin component, germanium component, a rhenium component, or mixtures thereof. The effective amount of the third catalytic modifier component may be uniformly or non-uniformly distributed throughout the catalyst. Generally, the catalysts will comprise from about 0.01 to about 10 wt.% of the third catalytic modifier metal component calculated on an elemental basis on the weight of the final composite. Preferably, the catalyst will comprise from about 0.1 to about 5 wt.% of the third catalytic modifier metal component and mixtures thereof.

The addition of the third catalytic modifier componenet can be achieved in a number of ways including impregnation of a catalyst with a third modifier metal containing solution, or incorporating a third modifier component into the catalyst during catalyst base formulation. The latter method, incorporating the third catalytic modifier metal into the catalyst during the preparation of the base is the preferred method of the present invention.

Specifically, this method involves adding a third catalytic modifier metal component to the refractory oxide support during its preparation. In the case where the catalyst is formulated from a sol of the desired refractory oxide, the third modifier metal would be incorporated into the sol before the catalyst was shaped. If the catalyst was formulated from a powder of the desired refractory oxide, the third modifier component would be added again prior to the shaping of the catalyst in the form of a dough into a particle.

When the third modifier metal component of the present invention comprises a germanium component, all of the germanium component may be present in the catalyst in an oxidation state above that of the elemental metal. This component may exist within the composite as a compound such as the oxide, sulfide, halide, oxychloride, aluminate, etc., or in combination with the carrier material or other ingredients of the composite. Preferably, the germanium component is used in an amount sufficient to result in the final catalytic composite containing, on an elemental basis, about 0.01 to about 10.0 wt.% germanium, with best results typically obtained with about 0.1 to about 5.0 wt.% germanium.

Alternatively, the third catalytic modifier component may comprise tin. Tin may be present as an elemental metal, as a chemical compound such as the oxide, sulfide, halide, oxychloride, etc., or as a physical or chemical combination with the porous carrier material and/or other components of the catalytic composite. The tin component is preferably utilized in an amount sufficient to result in a final catalytic composite containing about 0.01 to about 10 wt.% tin, calculated on an elemental basis, with best results obtained at a level of about 0.1 to about 5 wt.%.

Yet another alternative modifier metal component may comprise a lead component. This component may be present as an elemental metal, as a chemical compound such as the oxide, sulfide halide, etc., or as a physical or chemical combination with the porous carrier material and/or other components of the catalytic composite. The lead component is preferbly utilized in an amount sufficient to result in a final catalytic composite containing about 0.01 to about 5 wt.% lead, calculated on an elemental basis.

Germanium compounds which may be used include germanium oxide, germanium tetraethoxide, germanium tetrapropoxide, germanium tetrachloride, germanium difluoride, germanium tetrafluoride, germanium diiodide, germanium monosulfide and the like compounds. One particularly preferred impregnation solution comprises nascent germanium metal dissolved in chlorine water to yield a germanium oxychloride. A second preferred impregnation solution comprises germanium tetrachloride dissolved in anhydrous ethanol.

Suitable in salts or water-soluble compounds of tin wich may be used include stannous bromide, stannous chloride, stannic chloride, stannic chloride pentahydrate, stannic chloride tetrahydrate, stannic chloride trihydrate, stannic chloride diamine, stannic trichloride bromide, stannic chromate, stannous fluoride, stannic fluoride, stannic iodide, stannic sulfate, stannic tartrate, and the like compounds. The utilization of a tin chloride compound, such as stannous or stannic chloride is particularly preferred.

Typical of lead compounds which may be used are lead chloride, or lead nitrate.

The catayic composite of the present invention may also contain a halogen component. The halogen component may be either fluorine, chlorine, bromine or iodine or mixtures thereof. Chlorine and bromine are the preferred halogen components. The halogen component is generally present in a combined state with the porous carrier material ane alkali component. Although not essential to the invention, the halogen component is preferably well dispersed throughout the catalytic composite. The halogen component may comprise from more than 0.2 to about 15 wt.%, calculated on an elemental basis, of the final catalytic composite.

The optional halogen component may be incorporated in the catalytic composite in any suitable manner, either during the preparation of the carrier material or before, while or after other catalytic components are incorporated. For example, the alumina sol utilized to form the preferred aluminum carrier material may contain halogen and thus contribute at least some portion of the halogen content in the final catalyst composite. Also, the halogen component or a portion thereof may be added to the catalyst composite during the incorporation of the carrier material with other catalyst components, for example, by using chloroplatinic acid in impregnating a platinum component. Also, the halogen component or a portion thereof may be added to the catalyst composite by contacting the catalyst with the halogen or a compound, solution, suspension or dispersion containing the halogen before or after other catalyst components are incorporated with the carrier material. Suitable compounds containing the halogen include acids containing the halogen, for example, hydrochloric acid. Or, the halogen component or a portion thereof may be incorporated by contacting the catalyst with a compound, solution, suspension or dispersion containing the halogen in a subsequent catalyst regeneration step. The optional halogen component is preferably uniformly distributed throughout the catalyst particle.

After all the catalyst components have been combined with the porous carrier material, the resulting catalyst composite will generally be dried at a temperature of from about 100° to about 300° C. for a period of typically about 1 to 24 hours or more and thereafter calcined at a temperature of about 300° to about 600° C. for a period of about 0.5 to about 10 or more hours. Finally, the calcined catalyst composite is typically subjected to a reduction step before use in the hydrocarbon conversion process. This reduction step is effected at a temperature of about 100° to about 650° C. for a period of about 0.5 to about 10 or more hours in a reducing environment, preferably dry hydrogen, the temperature and time being selected to be sufficient to reduce substantially all of the platinum group component to the elemental metallic state.

Regarding the refractory oxide support, it is preferably a porous, absorptive support with high surface area of from about 5 to about 500 m$^2$/g. The porous carrier material should be relatively refractory to the conditions utilized in the hydrocarbon conversion process. It is intended to include within the scope of the instant invention the use of carrier materials which have traditionally been utilized in hydrocarbon conversion catalyst such as, for example (1) activated carbon, coke, or charcoal; (2) silica or silica gel, silicon carbide, clays, and silicates, including synthetically prepared and naturally occurring ones, which may or may not be acid treated, for example, attapulgus clay, china clay, diatomaceous earth, fuller's earth, kaolin, kieselguhr, etc.; (3) ceramics, porcelain, crushed firebrick, bauxite; (4) refractory inorganic oxides such as alumina, titanium dioxide, zirconium dioxide, chromium oxide, beryllium oxide, vanadium oxide, cerium oxide, hafnium oxide, zinc oxide, magnesia, boria, thoria, silica-alumina, silica-magnesia, chromia-alumina, alumina-boria, silica-zirconia, etc.; (5) crystalline zeolitic aluminosilicates such as naturally occurring or synthetically prepared mordenite and/or faujasite, for example, either in the hydrogen form or in a form which has been exchanged with metal cations, (6) spinels such as $MgAl_2O_4$, $FeAl_2O_4$, $ZnAl_2O_4$, $CaAl_2O_4$, and other like compounds having the formula $MO-Al_2O_3$ where M is a metal having a valence of 2; and (7) combinations of materials from one or more of these groups. The preferred carrier material for the instant catalyst is alumina, especially gamma- or eta-alumina.

Preferably, the catalyst of the present invention is nonacidic. "Nonacidic" in this context means that the catalyst has very little skeletal isomerization activity, that is, the catalyst converts less than 10 mole % of butene-1 to isobutylene when tested at dehydrogenation conditions and, preferably, converts less than 1 mole %. The acidity of the catalyst can be decreased if necessary to make the catalyst nonacidic by increasing the amount of the alkali component within the claimed range, or by treating the catalyst with steam to remove some of the halogen component.

While not a specific aspect of this invention, it is anticipated that a crystalline aluminosilicate zeolite could comprise a portion of the catalyst support of this invention. Such a support would be a mixture of a refractory oxide support and a zeolite. The support could then be impregnated with catalytic components as explained herein.

As heretofore indicated, the oxide support of the present invention has a nominal diameter (d) of from 50 to 10000 microns. By nominal diameter, it is meant that the particle must be no less than about 50 to 10000 microns thick at its narrowest or nominal dimension. Thus if the particle is spherical, it must have a diameter of at least about 50 microns while if it is cylindrical (as in the case of an extrudate), the diameter of the circular cross section must be at least about 50 microns and the length of the cylinder must be at least about 50 microns with no dimension being greater than 10000 microns. Likewise if the particle shape of the extrudate is a cube or elongated box, no side or height may be less than about 50 microns or greater than 10000.

The preferred alumina carrier material may be prepared in any suitable manner from synthetic or naturally occurring raw materials. The carrier may be formed in any desired shape such as spheres, pills, cakes, extrudates, etc. A preferred shape of alumina is the sphere. It is essential that the particle size be such that it has a nominal diameter of at least about 50 microns and no greater than about 10000, though particles having a nominal diameter of about 1600 microns or greater are preferred.

To make alumina spheres, aluminum metal is converted into an alumina sol by dissolving it in a suitable acid, and then dropping a mixture of the resulting sol and a gelling agent such as urea into an oil bath to form spherical particles of an alumina gel which are easily converted into the preferred gamma- or eta-alumina carrier material by known methods including aging, drying and calcining. To make alumina cylinders, an alumina powder is mixed with water and enough of a suitable peptizing agent such as nitric acid, for example, until an extrudable dough is formed. The dough is then extruded through a suitably sized die and cut to form extrudate particles. Other shapes of the alumina carrier material may also be prepared by conventional methods. After the alumina particles are shaped, generally they are dried and calcined. The alumina carrier may be subjected to intermedite treatments during its preparation, including washing with water or a solution of ammonium hydroxide, for example, which treatments are well known in the art. As mentioned, the modifier metal component is preferably added, and other components may be added to the preferred alumina carrier material during its preparation. For example, modifier metal component can be cogelled or coprecipitated with the alumina hydrosol or it may be added to the extrudable alumina dough, etc.

As indicated above, the catalyst of the present invention has particular utility as a hydrocarbon conversion catalyst. The hydrocarbon which is to be converted is contacted with the catalyst at hydrocarbon conversion conditions. These conditions include a temperature of from about 200° to 1000° C., a pressure of from atmospheric to about 25 atmospheres gauge and liquid hourly space velocities (LHSV) of from about 0.1 to about 100 $hr^{-1}$.

According to one embodiment of the invention, dehydrogenatable hydrocarbons are contacted with the catalytic composite of the instant invention in a dehydrogenation zone maintained at dehydrogenation conditions. This contacting may be accomplished in a fixed catalyst bed system, a moving catalyst bed system, a fluidized bed system, etc., or in a batch-type operation.

A fixed bed system is preferred. In this fixed bed system the hydrocarbon feed stream is preheated to the desired reaction temperature and then passed into the dehydrogenation zone containing a fixed bed of the catalyst. The dehydrogenation zone may itself comprise one or more separate reaction zones with heating means therebetween to ensure that the desired reaction temperature can be maintained at the entrance to each reaction zone. The hydrocarbon may be contacted with the catalyst bed in either upward, downward or radial flow fashion. Radial flow of the hydrocarbon through the catalyst bed is preferred for commercial scale reactors. The hydrocarbon may be in the liquid phase, a mixed vapor-liquid phase or the vapor phase when it contacts the catalyst. Preferably, it is in the vapor phase.

Hydrocarbons which may be dehydrogenated include dehydrogenatable hydrocarbons having from 2 to 30 or more carbon atoms. These hydrocarbons would include normal paraffins, branched paraffins, cyclopar-affins, normal olefins, branched olefins, cycloolefins, diolefins, diolefins, polyolefins, and the like hydrocarbons.

Examples of preferred paraffins include the normal paraffins ethane, propane, butane, pentane, hexane, and the like up to $C_{30}$ normal paraffin. Preferred branched paraffins would include isobutane, isopentane, isohexane, 2-methyl-1-dodecane, and the like hydrocarbons. Preferred cycloparaffins include cyclobutane, cyclopentane, cyclohexane, cyclododecane, and the like cycloparaffins.

Examples of olefins useful in the dehydrogenation process of this invention include normal olefins such as ethylene, propylene, 1-butene, 2-butene, 1-pentene, 2-pentene, 1-dodecene, and 4-dodecene among others. Useful branched olefins include isohexane, isopentene, 3-methyl-1-dodecene, and 4-methyl-1-nonene among others. Also useful are cycloolefins such as cyclooctene, cyclopentene, cyclohexene, cyclononene, and cyclododecene. Finally, diolefins and polyolefins useful in this process include among others 1,9-decadiene, cyclodeca-1,9-diene, 1,7-decadiene, and 1,5-decadiene. The catalyst is particularly useful for dehydrogenating hydrocarbons such as those mentioned above having from 2 to 15 or more carbon atoms.

Dehydrogenation conditions include a temperature of from about 400° to about 900° C., a pressure of from about 0.01 to 10 atmospheres and a liquid hourly space velocity (LHSV) of from about 0.1 to 100 $hr^{-1}$. Generally for normal paraffins the lower the molecular weight the higher the temperature required for comparable conversion. The pressure in the dehydrogenation zone is maintained as low as practicable, consistent with equipment limitations, to maximize the chemical equilibrium advantges. The preferred dehydrogenation conditions of the process of this invention include a temperature of from about 400°–700° C., a pressure from about 0.1 to 5 atmospheres, and a liquid hourly space velocity of from about 0.1 to 100 $hr^{-1}$.

The effluent stream from the dehydrogenation zone generally will contain unconverted dehydrogenatable hydrocarbons, hydrogen and the products of dehydrogenation reactions. This effluent stream is typically cooled and passed to a hydrogen separation zone to separate a hydrogen-rich vapor phase from a hydrocarbon-rich liquid phase. Generally, the hydrocarbon-rich liquid phase is further separated by means of either a suitable selective adsorbent, a selective solvent, a selective reaction or reactions or by means of a suitable fractionation scheme. Unconverted dehydrogenatable hydrocarbons are recovered and may be recycled to the dehydrogenation zone. Products of the dehydrogenation reactions are recovered as final products or as intermediate products in the preparation of other compounds.

The dehydrogenatable hydrocarbons may be admixed with a diluent gas before, while, or after being passed to the dehydrogenation zone. The diluent material may be hydrogen, steam, methane, carbon dioxide, nitrogen, argon and the like or a mixture thereof. Hydrogen is the preferred diluent. Ordinarily, when a diluent gas is utilized as the diluent it is utilized in amounts sufficient to ensure a diluent gas to hydrocarbon mole ratio of about 0.1 to about 20, with best results being obtained when the mole ratio range is about 0.5 to 10. The diluent hydrogen stream passed to the dehydrogenation zone will typically be recycled hydrogen separated from the effluent from the dehydrogenation zone in the hydrogen separation zone.

Water or a material which decomposes at dehydrogenation conditions to form water such as an alcohol, aldehyde, ether or ketone, for example, may be added to the dehydrogenation zone, either continuously or intermittently, in an amount to provide, calculated on the basis of equivalent water, about 1 to about 20,000 weight ppm of the hydrocarbon feed stream. About 1 to about 10,000 weight ppm of water addition gives best results when dehydrogenating paraffins having from 6 to 30 or more carbon atoms.

To be commercially successful, a dehydrogenation catalyst should exhibit three characteristics, namely high activity, high selectivity and good stability. Activity is a measure of the catalyst's ability to convert reactants into products at a specific set of reaction conditions, that is, at a specified temperature, pressure, contact time and concentration of diluent such as hydrogen, if any. For dehydrogenation catalyst activity, the conversion or disappearance of paraffins in percent relative to the amount of paraffins in the feedstock is measured. Selectivity is a measure of the catalyst's ability to convert reactants into the desired product or products relative to the amount of reactants converted. For catalyst selectivity, the amount of linear olefins in the product, in mole percent, relative to the total moles of the paraffins converted is measured. Stability is a measure of the rate of change with time on stream of the activity and selectivity parameters—the smaller rates implying the more stable catalysts.

Since dehydrogenation of hydrocarbons is an endothermic reaction and conversion levels are limited by chemical equilibrium, it is desirable in order to achieve high conversion to operate at high temperatures and low hydrogen partial pressures. At such severe conditions, it is difficult to maintain high activity and selectivity for long periods of time because undesirable side reactions such as aromatization, cracking, isomerization and coke formation increase. Therefore, it is advantageous to have a new hydrocarbon dehydrogenation catalyst with improved activity, selectivity and stability characteristics.

According to the unique process of the present invention, a mixture of dehydrogenatable hydrocarbons, and an optional diluent gas is contacted with the catalytic composite of the present invention in a dehydrogenation reaction zone maintained at dehydrogenation conditions. This contacting step may be accomplished by using the catalyst in a fixed bed system, a moving bed system, a fluidized bed system, or in a batch type operation. However, in view of the fact that the attrition losses of the valuable catalyst should be minimized and of the well known operational advantages, it is preferred to use either a fixed bed catalytic system, or a dense phase moving bed system such as is shown in U.S. Pat. No. 3,725,249.

If a fixed bed catalytic reaction system is used for the process of the present invention, it is anticipated that the reaction system could take many forms. The first possibility is that the reaction would comprise a single reaction zone within a single reactor with single inlet and outlet ports. All co-feeds would enter the inlet of the reactor and products and by-products would leave the system through the reactor outlet port.

A permeation of this flowscheme would be to have a reaction zone having one or more oxygen-containing gas inlet ports separate from the inlet or outlet ports so that oxygen could be injected at different points into the catalyst bed of the reaction zone. This type of configuration would mimic a reaction system with a plurality of catalyst beds only in this instance, it would be a single reaction zone in which the oxidation and dehydrogenation function of the catalysts was dispersed throughout the bed in a plurality of locations.

Of course, the catalyst could be distributed in a plurality of distinct reactors or a fixed bed reactor system having multiple beds. The choice of the best system would likely depend upon many factors including available equipment, particular reaction speed, and efficiency, as well as optimum reaction conditions for the two distinct reactions being performed. Regardless of the fixed bed catalyst system employed, the hydrocarbon may be contacted with the catalyst bed in either upward, downward, or radial flow fashion. Radial flow of the hydrocarbon through the catalyst bed is preferred for commercial scale reactors. The hydrocarbon must be in the vapor phase when it contacts the catalyst.

The process of the instant invention can best be accomplished in a moving bed catalytic system. Such a system is described in U.S. Pat. No. 3,725,249 and is most useful for use in a reaction where the catalyst becomes deactivated by coke deposition thereon. In such a situation, the catalyst of the instant process would continuously move through the plurality of reaction zones of the process and once deactivated, be transported to a continuous catalyst regeneration system. Once regenerated, the catalyst would be returned to the reaction system.

It is an aspect of this invention that the dehydrogenation conversion process be a complete process. That is to say, the process will comprise a reaction section and other sections such as gas recycle, liquid recycle, product recovery, and the like such that the process is viable and efficient. Examples of some of the product recovery techniques through could be employed alone or in combination in the product recovery zone of a hydrocarbon conversion process are: distillation including vacuum, atmospheric, and superatmospheric distillation; extraction techniques including, for example, liquid/liquid extractions, vapor/liquid extractions, supercritical extractions and others; absorption techniques, adsorption techniques, and any other known mass transfer techniques which can achieve the recovery of the desired products.

The following examples are introduced to further describe the catalyst and process of the invention. The examples are intended as illustrative embodiments and should not be considered to restrict the otherwise broad interpretation of the invention as set forth in the claims appended hereto.

EXAMPLE I

In order to demonstrate the advantages to be achieved by the present invention, a catalyst support was prepared. First, a spherical alumina support was prepared by the well-known oil-drop method. A tin component was incorporated in the support by commingling a tin component precursor with the alumina hydrosol and thereafter gelling the hydrosol. The tin component in this case was uniformly distributed throughout the catalyst particle. The spherical alumina support containing 0.5 wt.% tin had a diameter of about 1500 microns. The spherical tin containing base was then dried at 150° C. for 2 hours followed by calcination at 650° C. for 2 hours.

EXAMPLE II

This example details the preparation of Catalyst A, a surface-impregnated catalyst of this invention. The tin-containing support material of Example I was contacted with a solution containing mercaptosuccinic acid and lithium nitrate, followed by chloroplatinic acid. The catalyst was dried and then calcined at 540° C. for 2.5 hours. Catalyst A was next contacted with a nonacidified solution of chloroiridic acid ($H_2IrCl_6$) and dried in a rotary evaporator until no solution remained. The dried catalyst was then calcined at 300° C. for 2.5 hours and reduced in hydrogen at 500° C. for 2 hours. Catalyst A comprises 0.47 wt.% platinum, 0.36 wt.% iridium, 2.8 wt.% tin, and 0.66 wt.% lithium.

EXAMPLE III

This example details the preparation of Catalyst B, a catalyst of the prior art comprising a uniformly impregnated iridium component. A tin-containing support, as prepared in Example I, was contacted with a solution containing chloroplatinic acid and 3.4 wt.% nitric acid. The catalyst was then dried in a rotary evaporator to remove any free water from the solution and then calcined at 540° C. for 2.5 hours. The platinum- and tin-containing catalyst was then contacted with a solution of chloroiridic acid and 9 wt.% HCL, dried as above in a rotary evaporator, and calcined at 300° C. for 2.5 hours. Finally, Catalyst B was impregnated with lithium nitrate, dried, and calcined at 300° C. for 2.5 hours. Catalyst B thus produced, comprised 0.34 wt.% platinum, 0.35 wt.% iridium, 0.55 wt.% lithium, and 0.5 wt.% tin.

EXAMPLE IV

In this example, Catalyst A of the present invention and Catalyst B of the prior art was evaluated by Scanning Electron Microscopy (SEM). The purpose of this analysis was to identify the relative distribution of impregnated iridium component across the radius of a catalyst pill of each example catalyst previously mentioned. Before proceeding, it should be noted that the SEM data does not show the actual level of iridium at any one point within the catalyst pill, but indicates only the relative metals distribution profile in relation to the alumina level. In other words, the results of each analysis may not be based upon a zero point and attempting to integrate a distribution curve is not possible and could lead to interpretation errors as the entire curve could be shifted either up or down. Therefore, the curves are useful for making relative comparisons of metal distributions only.

Figure 2:
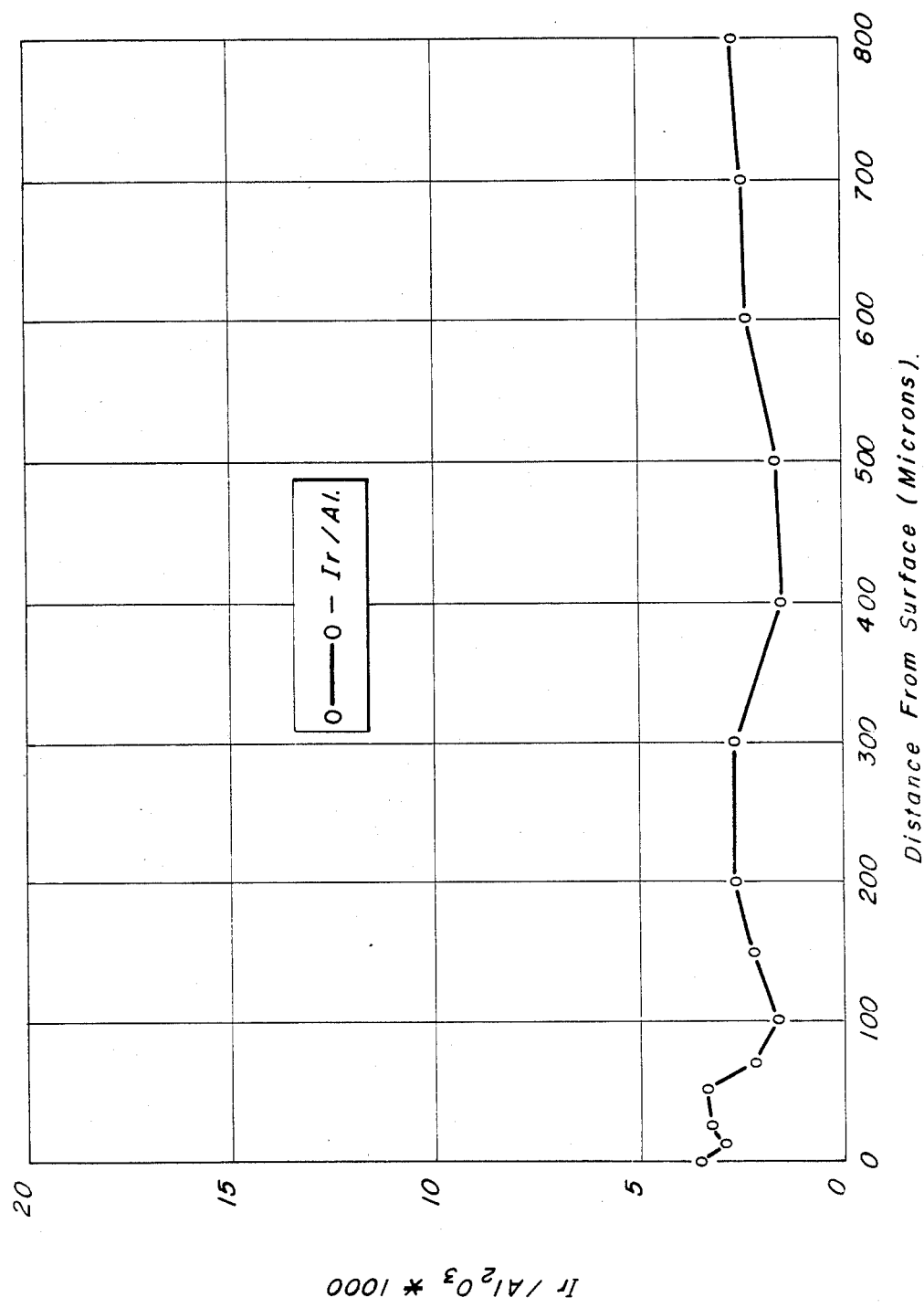

An examination of the iridium levels across the catalyst pills of Catalyst A and B, as found in FIGS. 1 and 2, shows the iridium distribution of Catalyst A of the instant invention to be contained essentially within the exterior layer of the catalyst particle. For Catalyst A, the iridium level begins at a (Ir K-metal/K-al)*1000 value of about 8 on the surface of the particle and drops to a value of about 2 at the 0.4 d on 320 micronn center core of the catalyst. Catalyst A can, therefore, be characterized as being surface-impregnated with platinum as the concentration of iridium in the 0.2 d micron surface layer is over twice the relative iridium concentration in the 0.4 d micron center core of the catalyst support for each catalyst. This is in contrast to Catalyst B of the prior art which exhibits a constant (Ir K-metal/K-Al)*1000 values of 3 across the entire radius of the catalyst pill, as seen in FIG. 2. Catalyst B, therefore, can be described as being uniformly impregnated with iridium.

EXAMPLE V

This example compares the performance of a catalyst of this invention with one not of this invention in a process for the dehydrogenation of dehydrogenatable hydrocarbons. The purpose of the comparison is to prove that the combination of iridium and platinum (both Group VIII metals) creates a catalyst superior to a catalyst with merely more platinum on the catalyst. Catalyst C is a catalyst of this invention prepared essentially identically to Catalyst A of Example II except that the iridium component was surface-impregnated on an alumina catalyst support having a nominal diameter varying from 250 to 420 microns. The platinum component of this catalyst is uniformly impregnated in the first step because of the presence of 3.4 wt.% nitric acid (based on the weight of the support) in the first impregnated solution. The resulting catalyst consisted of 0.39 wt.% platinum, 0.5 wt.% tin, 0.53 wt.% lithium, and 0.41 wt.% surface-impregnated iridium. This catalyst comprises 0.80 wt.% Group VIII metal components.

Catalyst D not of this invention was prepared in a manner similar to that of Catalyst C except that instead of undergoing an iridium impregnation step, the catalyst was impregnated a second time with a chloroplatinic acid solution containing 2.0 wt.% hydrochloric acid. The catalyst was dried and calcined at 300° C. for 2.5 hours. Catalyst D comprised 0.77 wt.% platinum, 0.5 wt.% tin, and 0.60 wt.% lithium. This catalyst comprises 0.77 wt.% Group VIII metal components.

Both catalysts were subjected to a reduction step before being tested in a dehydrogenation pilot plant. In the reduction step, both Catalysts C and D were contacted with hydrogen at 500° C. for 2 hours.

The catalysts were then evaluated for their ability to dehydrogenate $C_{10}$–$C_{13}$ paraffins in a dehydrogenation pilot plant. The pilot plant was operated at an inlet temperature of 500° C., at a pressure of 0.68 atmospheres, and at a weight hourly space velocity of 120 hr$^{-1}$. Hydrogen and water were both co-feeds to the reaction zone. Water was added to the feed at a rate such that the feed comprised 2000 wt. ppm of water. Hydrogen was added to the feed so that the $H_2$/hydrocarbon molar feed ratio was 3. Finally, the hydrocarbon feedstock comprised by weight 0.1% n-$C_9$, 21.6% n-$C_{10}$, 39.4% n-$C_{11}$, 27.3% n-$C_{12}$, 8.2% n-$C_{13}$, 0.7% n-$C_{14}$, 2.7% nonnormals, and 0.1% $C_9$.

The two catalysts were evaluated for their ability to convert the paraffins into alternative compounds (n-paraffin conversion) and for their ability to produce normal olefinic conversion products (TNO selectivity). The results of the pilot plants testing can be found in Table 1 below.

| Hours on Stream | N-Paraffin Conversion (wt. %) | | TNO Selectivity (wt. %) | |
|---|---|---|---|---|
| | Catalyst C | Catalyst D | Catalyst C | Catalyst D |
| 4 | 23.1 | 19.0 | 91.8 | 90.3 |
| 8 | 20.9 | 16.0 | 93.0 | 92.2 |
| 12 | 19.5 | 14.6 | 93.7 | 93.3 |
| 16 | 18.5 | 13.0 | 94.0 | 93.4 |
| 20 | 17.9 | 11.8 | 94.2 | 93.6 |
| 32 | 16.2 | 10.5 | 94.5 | 93.7 |
| 40 | 15.0 | 9.4 | 94.8 | 93.4 |

The results of the pilot plant tests indicate that the combination of platinum/iridium in a catalyst exhibits dehydrogenation performance superior to a similar catalyst comprising comparable amounts of the noble metal platinum. Thus, the improvement exhibited by the instant catalyst is a result of the presence of iridium and not due to the presence of extra amounts of noble metals.

EXAMPLE VI

This example compares the dehydrogenation ability of Catalyst E of this invention with Catalyst F not of this invention and comprising a uniformly impregnated iridium component.

Catalyst E of this invention was prepared essentially identically to Catalyst C of Example V. Catalyst E was prepared on a catalyst support having a nominal diameter ranging from 250 to 420 microns. Catalyst E contained 0.41 wt.% uniformly impregnated platinum, 0.5 wt.% impregnated tin, 0.54 wt.% uniformly impregnated lithium, and 0.40 wt.% surface-impregnated iridium.

Catalyst F ws prepared by a first step coimpregnation of platinum and lithium in the presence of 3.4 wt.% nitric acid, followed by a second step impregnation of chloroiridic acid in the presence of 6.5 wt.% nitric acid. Once Catalyst F had been uniformly impregnated with platinum, lithium, tin, and iridium, it was crushed and classified such that the catalyst particle nominal diameter ranged from 250 to 420 microns. Catalyst F comprised 0.41 wt.% platinum, 0.5 wt.% tin, 0.32 wt.% iridium, and 0.61 wt.% lithium all essentially uniformly-impregnated.

Catalysts E and F were tested in a dehydrogenation pilot plant following the method established in Example V. The selectivity and conversion results of each catalyst is described in Table 2 below.

| Hours on Stream | N—Paraffin Conversion (wt. %) | | Two Selectivity (wt. %) | |
|---|---|---|---|---|
| | Catalyst E | Catalyst F | Catalyst E | Catalyst F |
| 4 | 22.0 | 19.0 | 90.8 | 91.0 |
| 8 | 20.0 | 15.7 | 92.0 | 92.1 |
| 12 | 19.0 | 14.9 | 92.3 | 92.2 |
| 16 | 18.0 | 14.0 | 92.5 | 93.0 |
| 20 | 17.3 | 13.2 | 92.6 | 93.5 |
| 32 | 15.6 | 11.4 | 93.5 | 94.6 |
| 40 | 14.6 | 10.7 | 94.1 | 94.7 |

The results indicate that Catalyst E of this invention exhibits an ability to convert paraffins in the dehydrogenation pilot plant that is far superior to Catalyst F of the prior art. On the other hand, the catalysts exhibit almost identical total normal olefin selectivities with Catalyst E of the instant invention holding a slight selectivity advantage at identical conversion levels. Thus, a catalyst containing a surface-impregnated iridium component is superior in dehydrogenation performance to a catalyst of the prior art containing uniformly impregnated iridium.

What is claimed is:

1. A catalytic composite comprising platinum, a first catalytic modifier component selected from Group IA and IIA elements of the Periodic Table of the Elements or mixtures thereof, a second catalytic modifier component selected from the group iridium, osmium, or mixtures thereof, and a third catalytic modifier component selected from one or more elements of Group IVA of the Periodic Table of the Elements, all on a refractory oxide support having a nominal diameter (d) of from 50 to 10000 microns, the catalytic composite characterized in that the second catalytic modifier component is surface-impregnated upon the catalytic composite such that the average concentration of the surface-impregnated second catalytic modifier component on the outside 0.2 d micron layer of the catalyst is at least 2 times the average concentration of the second catalytic modifier component in the 0.4 d micron diameter center core of the catalyst, and wherein the first modifier metal component is uniformly impregnated through the refractory oxide support.

2. The catalytic composite of claim 1 further characterized in that the third modifier metal component comprises tin.

3. The catalytic composite of claim 1 further characterized in that the first catalytic modifier component is lithium.

4. The catalytic composite of claim 1 further characterized in that the surface-impregnated second modifier component is iridium.

5. The catalytic composite of claim 1 further characterized in that the refractory oxide support comprises alumina.

6. The catalytic composite of claim 1 further characterized in that it comprises an optional halogen component.

7. The catalytic composite of claim 6 further characterized in that the optional halogen component comprises a chlorine component.

8. A catalytic composite comprising from 0.01 to 5.0 wt.% platinum, from 0.01 to 10.0 wt.% of a first catalytic modiifer component selected from Group IA and IIA elements of the Periodic Table of the Elements or mixtures thereof, from 0.01 to 5.0 wt.% of a second catalytic modifier component selected from the group iridium, osmium, or mixtures thereof, and from 0.01 to 10.0 wt.% of a third catalytic modifier component selected from elements of Group IVA of the Periodic Table of the Elements or mixtures thereof, all on an alumina support having a nominal diameter (d) of from 50 to 10000 microns, the catalytic composite characterized in that the second catalytic modifier component is surface-impregnated such that the average concentration of the surface-impregnated second catalytic modifier component on the outside 0.2 d micron layer of the catalyst is at least 2 times the average concentration of the second catalytic modifier component in the 0.4 d micron diameter center core of the catalyst and wherein the first modifier component is uniformly impregnated.

9. The catalytic composite of claim 8 further characterized in that the third modifier component is tin.

10. The catalytic composite of claim 8 further characterized in that the second modifier component is lithium.

11. A catalytic composite comprising from 0.1 to 2.0 wt.% platinum, from 0.1 to 5.0 wt.% lithium, from 0.1 to 2.0 wt.% iridium, and from 0.1 to 5.0 wt.% tin, all on an alumina support having a nominal diameter (d) of about 850 to 2500 microns and characterized in that the iridium component is surface impregnated such that the average concentration of the surface-impregnated iridium on the outside 0.2 d micron layer of the catalyst is at least 2 times the average concentration of the iridium in the 0.4 d micron diameter center core of the catalyst, and wherein the platinum, lithium, and tin components are all uniformly impregnated.

* * * * *